G. THOMAS.
WEEDER SHOE.
APPLICATION FILED DEC. 8, 1917.
1,262,286. Patented Apr. 9, 1918.
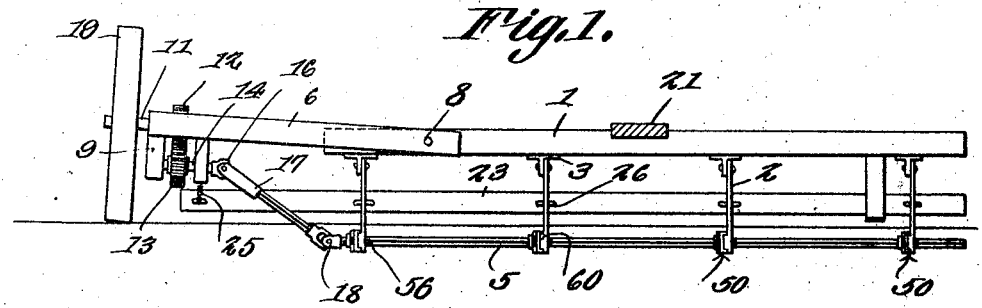
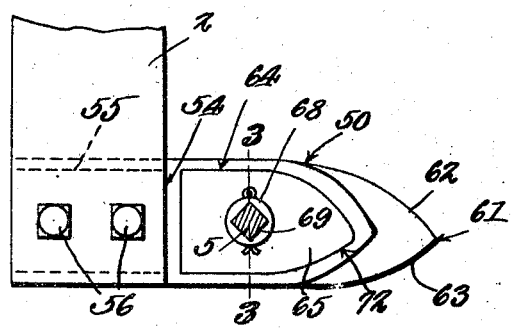
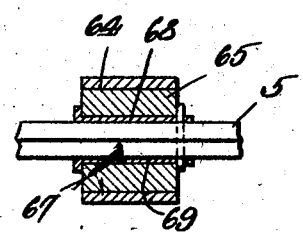
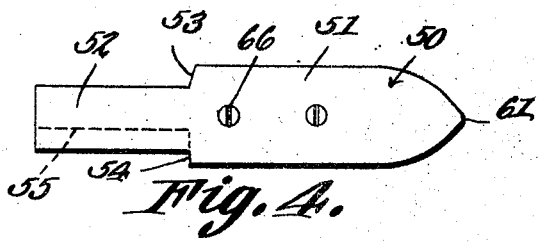
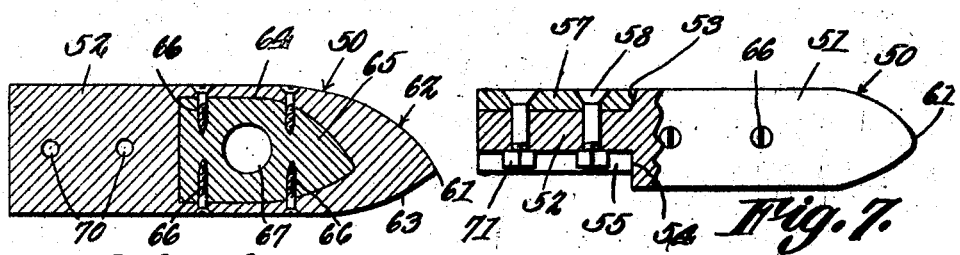
Inventor,
Gustav Thomas
By C. A. Snow & Co.
Attorneys
Witness

UNITED STATES PATENT OFFICE.

GUSTAV THOMAS, OF LIND, WASHINGTON.

WEEDER-SHOE.

1,262,286.        Specification of Letters Patent.        Patented Apr. 9, 1918.

Application filed December 8, 1917. Serial No. 206,229.

*To all whom it may concern:*

Be it known that I, GUSTAV THOMAS, a citizen of the United States, residing at Lind, in the county of Adams and State of Washington, have invented a new and useful Weeder-Shoe, of which the following is a specification.

The device forming the subject matter of this invention is a weeder of that general type in which a rod of polygonal cross section moves beneath the surface of the soil, and is rotated, for the purpose of cutting and macerating weeds.

One object of the invention is to provide an improved bearing for the shaft or rod which rotates beneath the surface of the soil.

Another object of the invention is to improve the construction of the shoe wherein the shaft is journaled, the shoe being so constructed, and the shaft being so mounted with respect to the shoe and the support which carries the shoe, that the shaft will be maintained in position beneath the surface of the soil.

In order that the objects of this invention may be clearly understood, it is necessary to refer at some length to, and to comment without derogation upon, certain structures which the prior art discloses.

Patent No. 1,232,149, granted on the 3rd day of July, 1917, to Garnett H. Wolfe, shows a rotary rod weeder over which this application proposes sundry improvements. In the patent above alluded to, the rotary rod or shaft which cuts and macerates the weeds is located in vertical alinement with a support whereby the rod or shaft is connected with the main frame of the machine. It has been found, in practice, that the rotary rod or shaft maintains its position beneath the surface of the soil with difficulty, and it is proposed in this application to mount the rod or shaft slightly in advance of the support, in a shoe, which, projecting forwardly from the support, holds the rotary rod in place. It is proposed, further, so to taper or point the shoe that the same will maintain a secure hold upon the ground, thereby retaining the rod or shaft in position.

The rotary rod or shaft, moving beneath the surface of the soil, is subjected to great strain, and much friction is imposed on the bearings whereby the rod or shaft is carried. As a consequence, the bearings for the shaft require frequent renewal, this present application proposing a simple but efficient bearing for the shaft, so constructed that it can be made without difficulty or expense, and be renewed readily. Patent No. 1,224,874, granted on May 1, 1917 to Garnett H. Wolfe, shows a bearing adapted for the ends in view, but this bearing is somewhat complicated and does not remove the wear entirely from the relatively fixed parts of the machine, the bearing, further, being so constructed that it must be made in a machine shop, whereas, the bearing forming the subject matter of this application, can be produced readily and with a minimum amount of effort, by a person having simple wood working tools.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings:

Figure 1 shows in elevation, a portion of a machine whereunto the device forming the subject matter of this application has been applied;

Fig. 2 is a fragmental side elevation showing the shoe mounted on the support;

Fig. 3 is a section taken approximately on the line 3—3 of Fig. 2;

Fig. 4 is a top plan of the shoe;

Fig. 5 is a rear elevation of the shoe;

Fig. 6 is a longitudinal section of the shoe; and

Fig. 7 is a top plan wherein parts are broken away and in section, the support being connected to the shoe in a different way from that disclosed in Fig. 2.

In the drawings there is shown a portion of a weeder, including a frame comprising a transverse beam 1 and a rearwardly projecting beam 21. Brackets 3 are carried by the beam 1 and are attached to the upper ends of depending supports 2. The numeral 19 marks a traction wheel carried by a shaft 11 journaled in blocks 9 on an extension frame 6 pivotally connected at 8 with the transverse beam 1. A counter shaft 14 is journaled in the blocks 9. A spur gear 12 on the shaft 11 meshes into a spur gear 13 on the counter shaft 14. By means of a universal joint 16, one end of the counter shaft 14 is connected to a telescopic shaft 17 united by means of the universal joint 18 with a horizontal weeding shaft 5, in the form of a rod preferably rectangular in cross section. The numeral 23 marks a hitch bar connected at 26 with the supports 2 and connected at 25 with one of the blocks 9. Rotation is imparted to the shaft 5 by means of the universal joint 18, the telescopic shaft 17, the universal joint 16, the counter shaft 14, the gear 13, the gear 12, the shaft 11, and the traction wheel 19. The shaft 5 moves beneath the surface of the soil and cuts or macerates the weeds. The structure described is old, being shown in Patent No. 1,232,149, above alluded to. It is in such a structure, however, that sundry improvements are proposed, as hereinafter described.

The numeral 50 denotes a shoe made of metal and including a body 51 and a stem 52 forming shoulders 53 and 54 located on opposite sides of the stem 52. In one side of the stem 52, adjacent the shoulder 54, a longitudinal groove 55 is fashioned. The support 2 engages one side of the stem 52 and abuts against the shoulder 54, the support having, if desired, a laterally projecting lug 60 which is received in the groove 55 and fills the same completely. There are horizontal openings 70 in the stem 52 and through these openings, securing devices 56 pass, the securing devices preferably being in the form of bolts, passing through the lower end of the support 2. Since the support 2 at its forward edge bears against the shoulder 54, and because the lug 60 is received in the groove 55, these parts, together with the bolts 56, afford an unusually secure connection between the shoe and the support 2.

It is not necessary that the supports 2 have the lugs 60 or that the support shall abut against the shoulder 54. The support, as shown at 57 in Fig. 7, may be devoid of the lug 60, and may bear against the shoulder 53, the support being connected to the stem of the shoe by means of securing devices 58, preferably in the form of bolts, the nuts 71 of which are housed in the groove 55.

The shoe 50 is tapered to form a point 61. The taper 62 on the upper edge of the shoe is longer and less abrupt than the taper 63 on the lower edge of the shoe, and the shoe, therefore, will always retain a secure hold on the ground, a point of peculiar importance when it is understood, as will be explained hereinafter, that the shaft 5 is journaled for rotation in the shoe 50 in advance of the support 2.

The shoe 50 has a transverse opening 64 extended entirely through the shoe horizontally, and tapered toward its forward end, as shown at 72, to approximate the general outline of the shoe when the latter is viewed sidewise, as shown in Fig. 2. In the opening 64 is mounted a block 65, made of hard wood. The block 65 approximates closely the shape of the opening 64 and may be slid into the opening horizontally from either side of the shoe, the block being held in place by ordinary wood screws 66, extended upwardly and downwardly into the shoe and engaging the block, as shown in Fig. 6. The block 65 has a circular opening 67 in which a simple bushing 68 of any desired kind is journaled for rotation, the bushing having an opening 69 corresponding in cross section to the cross section of the shaft 5 and receiving the shaft.

It is inevitable and unavoidable that the shaft 5, moving beneath the surface of the soil, produces much friction, and the bearing for the shaft must be renewed frequently. In the device herein disclosed the wooden block 65 may be removed by detaching the screws 66, and any person, having simple wood working tools, can shape a new block to fit in the opening.

It is to be observed that the shaft 5 is journaled in the shoe 50, in advance of the support 2 and independently of the support. This fact, together with the pointed construction of the shoe 50, causes the shaft to remain beneath the surface of the soil to operate at the desired depth.

Having thus described the invention, what is claimed is:

1. In a device of the class described, a frame; a support carried by the frame; a shoe mounted on the support and projecting forwardly from the support, the shoe being tapered forwardly; a weeder shaft of polygonal cross section journaled in the shoe in advance of the support and adapted to travel underground along with the shoe; and means for rotating the shaft, the device being characterized by the fact that the taper at the top of the shoe, toward the point of the shoe, is longer and less abrupt than the taper at the bottom of the shoe toward the point of the shoe.

2. In a device of the class described, a frame; a support carried by the frame; a shoe mounted on the support and pointed at its forward end, the shoe projecting forwardly from the support and being provided with a transverse opening; a renewable non-metallic block in the opening; a securing device engaging the shoe and the block; a bushing journaled in the block independently of the shoe; a weeder shaft of polygonal cross section whereon the bushing is carried, the shaft being adapted to travel underground along with the shoe; and means for rotating the shaft.

3. In a device of the class described, a frame; a support carried by the frame; a shoe mounted on the support and projecting forwardly from the support, the shoe being pointed at its forward end and having a horizontal opening therethrough; a wooden block mounted in the opening; a screw passing vertically through a portion of the shoe and engaging the block; a weeder shaft of polygonal cross section journaled in the shoe and adapted to travel along with the shoe underground; and means for rotating the shaft.

In testimony that I claim the foregoing as my own, I have hereto affixed my signature in the presence of two witnesses.

GUSTAV THOMAS.

Witnesses:
H. S. SNEAD,
C. H. FINK.